US011513938B2

(12) United States Patent
Gowda et al.

(10) Patent No.: US 11,513,938 B2
(45) Date of Patent: Nov. 29, 2022

(54) DETERMINING CAPACITY IN STORAGE SYSTEMS USING MACHINE LEARNING TECHNIQUES

(71) Applicant: EMC IP Holding Company LLC, Hopkinton, MA (US)

(72) Inventors: Deepak Gowda, North Carolina, NC (US); Bina K. Thakkar, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 451 days.

(21) Appl. No.: 16/729,841

(22) Filed: Dec. 30, 2019

(65) Prior Publication Data

US 2021/0200659 A1    Jul. 1, 2021

(51) Int. Cl.
*G06F 11/34*     (2006.01)
*G06F 11/30*     (2006.01)
(Continued)

(52) U.S. Cl.
CPC ........ *G06F 11/3442* (2013.01); *G06F 3/0604* (2013.01); *G06F 3/0631* (2013.01); *G06F 3/0644* (2013.01); *G06F 9/542* (2013.01); *G06F 11/3034* (2013.01); *G06N 20/00* (2019.01); *G06F 3/067* (2013.01)

(58) Field of Classification Search
CPC .. G06F 11/3442; G06F 3/0604; G06F 3/0631; G06F 3/0644; G06F 9/542; G06F 11/3034; G06F 3/067; G06F 3/0653; G06F 11/0727; G06F 11/0793; G06F 11/3447; G06F 11/3476; G06N 7/005; G06N 20/00
See application file for complete search history.

(56) References Cited

U.S. PATENT DOCUMENTS 9,940,033 B1 *  4/2018  Alshawabkeh ....... G06F 3/0653
9,953,351 B1    4/2018  Sivasubramanian et al.
(Continued)

OTHER PUBLICATIONS

Taylor et al., Facebook Research, Prophet: forecasting at scale, research.fb.com/blog/2017/02/prophet-forecasting-at-scale/, Feb. 23, 2017.

*Primary Examiner* — Jorge A Chu Joy-Davila
(74) *Attorney, Agent, or Firm* — Ryan, Mason & Lewis, LLP (57) ABSTRACT

Methods, apparatus, and processor-readable storage media for determining capacity in storage systems using machine learning techniques are provided herein. An example computer-implemented method includes obtaining capacity-related data from a storage system; forecasting, for a given temporal period, capacity of one or more storage objects of the storage system by applying machine learning techniques to at least a portion of the capacity-related data; aggregating the forecasted capacity for at least portions of the one or more storage objects; determining, based on the aggregated forecasted capacity of the storage objects, whether at least a portion of the storage system will run out of capacity in connection with the given temporal period; and performing one or more automated actions based at least in part on the determination as to whether the at least a portion of the at least one storage system will run out of capacity.

20 Claims, 6 Drawing Sheets

(51) Int. Cl.
    *G06F 3/06*         (2006.01)
    *G06F 9/54*         (2006.01)
    *G06N 20/00*      (2019.01)

(56) References Cited

U.S. PATENT DOCUMENTS

| | | | |
|---|---|---|---|
| 10,216,458 B2 | 2/2019 | Sabloniere | |
| 10,250,684 B2 | 4/2019 | Dimnaku et al. | |
| 10,564,998 B1* | 2/2020 | Gritter | G06F 9/5083 |
| 10,949,116 B2* | 3/2021 | Kaushik | G06F 3/0631 |
| 2017/0098239 A1* | 4/2017 | Yan | G06Q 30/0247 |
| 2019/0163759 A1* | 5/2019 | Devarao | G06F 16/252 |
| 2020/0034745 A1* | 1/2020 | Nagpal | G06N 20/00 |
| 2020/0184355 A1* | 6/2020 | Mehta | G06F 16/35 |
| 2020/0393983 A1* | 12/2020 | Gupta | G06F 3/0632 |

\* cited by examiner

300 — For a given pool:
   Extract historical time series data
      fill missing time series data
   Forecast for the next 24 hours using forecasting algorithm to determine if the pool is likely to run out of capacity in the next 24 hours If pool is found to be running out of capacity:
      Extract all the storage objects associated with the pool.
      For each of the storage objects:
         Extract historical time series data
            Fill missing time series data
         Forecast for the next 24 hours using forecasting algorithm
      Aggregate forecasts of all the storage objects and compare with the pool to determine if the pool is likely to run out of capacity

DETERMINING CAPACITY IN STORAGE SYSTEMS USING MACHINE LEARNING TECHNIQUES

FIELD

The field relates generally to information processing systems, and more particularly to techniques for managing storage resources in such systems.

BACKGROUND

Due to increasing data growth, storage systems are commonly prone to running out of capacity. Additionally, contemporary storage systems are increasingly complicated and can be configured, for example, to permit oversubscription across a limited number of pools (for instance, wherein each pool contains hundreds or thousands of storage objects such as logical unit numbers (LUNs) and/or file systems). Yet, such storage objects also present risks related to causing corresponding pools to run out of capacity. Conventional storage management approaches include utilizing capacity threshold alerts and notifications. However, such alerts and notifications are typically rule-based and act exclusively on data at the pool level, which commonly results in false positives and false negatives when predicting capacity exhaustion.

SUMMARY

Illustrative embodiments of the disclosure provide techniques for determining capacity in storage systems using machine learning techniques. An exemplary computer-implemented method includes obtaining capacity-related data from at least one storage system, and forecasting, for a given temporal period, capacity of each of one or more storage objects of the at least one storage system by applying one or more machine learning techniques to at least a portion of the obtained capacity-related data. Such a method also includes aggregating the forecasted capacity for at least portions of the one or more storage objects, and determining, based at least in part on the aggregated forecasted capacity of the one or more storage objects, whether at least a portion of the at least one storage system will run out of capacity in connection with the given temporal period. Further, such a method additionally includes performing one or more automated actions based at least in part on the determination as to whether the at least a portion of the at least one storage system will run out of capacity.

Illustrative embodiments can provide significant advantages relative to conventional storage management approaches. For example, challenges associated with false positives and false negatives when predicting capacity exhaustion are overcome in one or more embodiments through predicting pool-level capacity exhaustion based on storage object-level capacity forecasts determined via utilization of machine learning techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
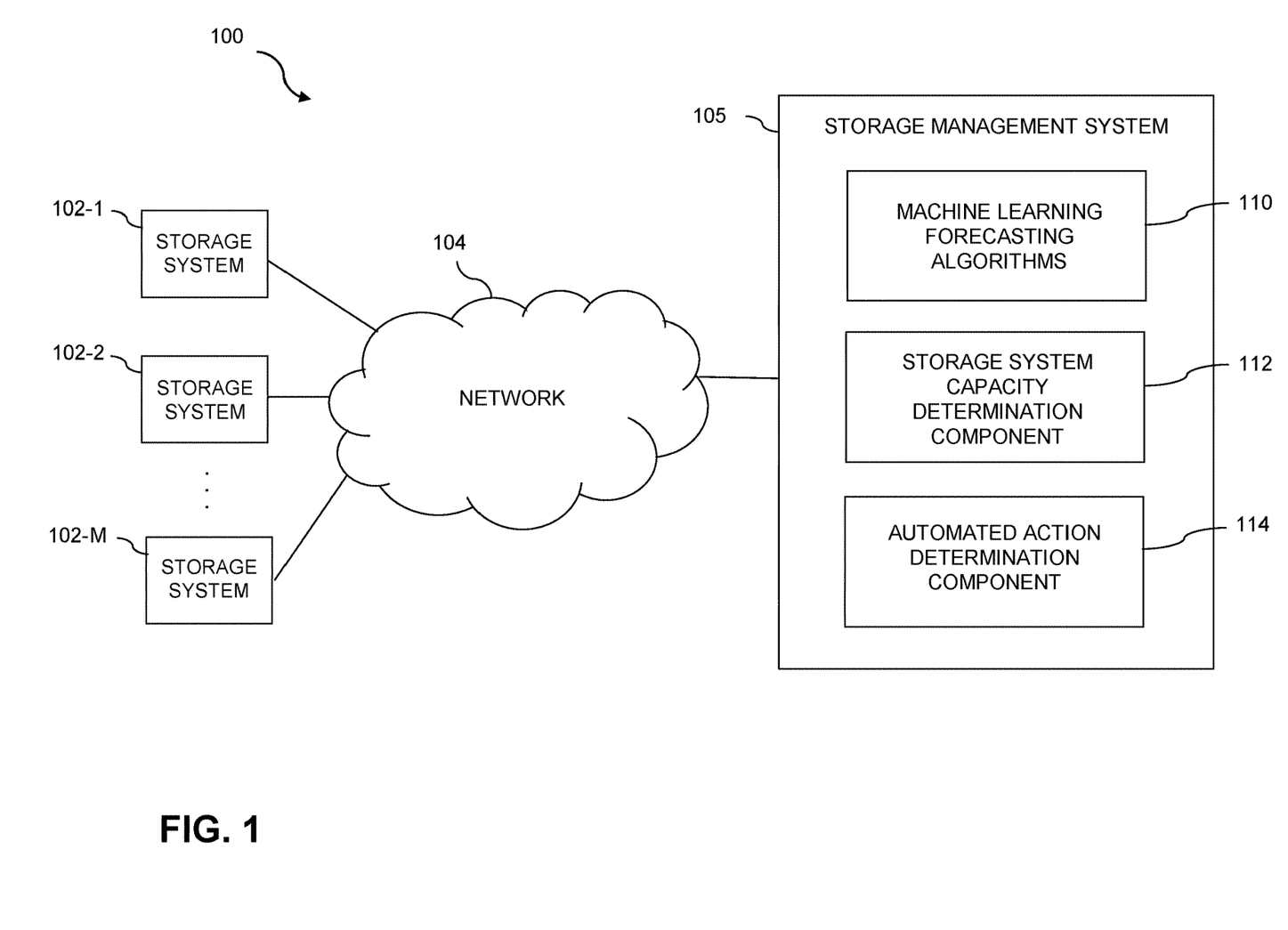
FIG. 1 shows an information processing system configured for determining capacity in storage systems using machine learning techniques in an illustrative embodiment.

FIG. 1 shows a computer network (also referred to herein as an information processing system) 100 configured in accordance with an illustrative embodiment. The computer network 100 comprises a plurality of storage systems 102-1, 102-2, ... 102-M, collectively referred to herein as storage systems 102. It is to be appreciated that storage systems 102 are utilized in FIG. 1 as merely an example of a type of system that can be utilized in accordance with at least one embodiment, and other types of systems can be utilized in one or more embodiments. Accordingly, the storage systems 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is storage management system 105.

The storage systems 102 may comprise any of a variety of different types of storage including network-attached storage (NAS), storage area networks (SANs), direct-attached storage (DAS) and distributed DAS, as well as combinations of these and other storage types, including software-defined storage.

The storage systems 102 in some embodiments comprise respective systems associated with a particular company, set of users, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the storage management system 105 in the FIG. 1 embodiment is assumed to be implemented using at least one processing device. Each such processing device generally comprises at least one processor and an associated memory, and implements one or more functional modules for controlling certain features of the storage management system 105.

More particularly, the storage management system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface allows the storage management system 105 to communicate over the network 104 with the storage systems 102, and illustratively comprises one or more conventional transceivers.

As also depicted in FIG. 1, the storage management system 105 further comprises machine learning forecasting algorithms 110, a storage system capacity determination component 112, and an automated action determination component 114.

It is to be appreciated that this particular arrangement of elements 110, 112 and 114 illustrated in the storage management system 105 of the FIG. 1 embodiment is presented by way of example only, and alternative arrangements can be used in other embodiments. For example, the functionality associated with the elements 110, 112 and 114 in other embodiments can be combined into a single module, or separated across a larger number of modules. As another example, multiple distinct processors can be used to implement different ones of the elements 110, 112 and 114 or portions thereof.

At least portions of the elements 110, 112 and 114 may be implemented at least in part in the form of software that is stored in memory and executed by a processor.

It is to be understood that the particular set of elements shown in FIG. 1 for determining capacity in storage systems using machine learning techniques involving storage systems 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing elements 110, 112 and 114 of an example storage management system 105 in computer network 100 will be described in more detail with reference to the flow diagram of FIG. 4.

Figure 2:
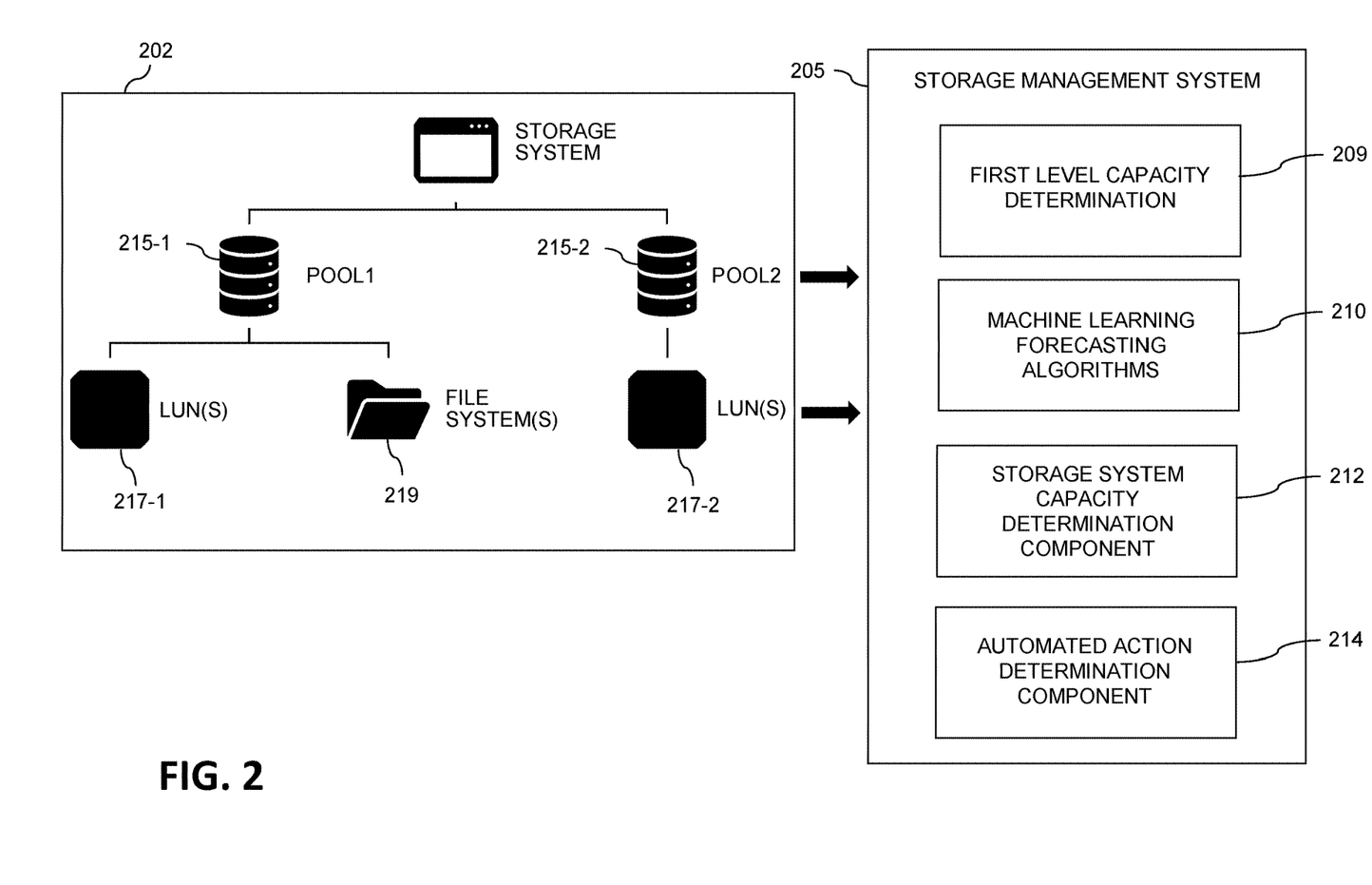
FIG. 2 shows an information processing system configured for determining capacity in storage systems using machine learning techniques in an illustrative embodiment.

FIG. 2 shows an information processing system configured for determining capacity in storage systems using machine learning techniques in an illustrative embodiment. In conjunction with one or more embodiments, it is noted that within storage systems, a given pool can assign and/or allocate more storage to storage objects (e.g., LUNs and file systems) than the pool has in capacity (also referred to as over-subscription).

As such, FIG. 2 depicts storage system 202, which includes a first pool 215-1 and a second pool 215-2. Also, as illustrated in FIG. 2, pool 215-1 includes LUN(s) 217-1 and file system(s) 219, while pool 215-2 includes LUN(s) 217-2. Also depicted in FIG. 2 is storage management system 205 that includes a first level capacity determination component 209, machine learning forecasting algorithms 210, storage system capacity determination component 212, and automated action determination component 214.

In accordance with example arrangement depicted in FIG. 2, at least one embodiment includes performing a first-level (e.g., pool-level) check with respect to capacity data for a storage system (e.g., storage system 202). The capacity data can include one or more configurable attributes. Such attributes used for a first-level (e.g., pool-level) check can include, for example, a sizeUsed attribute. Additionally, performing the first-level check includes utilizing such capacity data to predict (e.g., based on the last seven days of usage data) if a pool (e.g., pool 215-1 or pool 215-2) is likely to run out of capacity over a given period of time (e.g., in the next 24 hours). In one or more embodiments, such predicting can be carried out in response to every item of capacity change activity.

If the pool is likely to run out of capacity over the given period of time, at least one embodiment includes performing a second-level (e.g., storage object-level) check with respect to capacity data for the storage system. As noted above in connection with the first-level check, the capacity data utilized in connection with the second-level check can include one or more configurable attributes. Such attributes used for a second-level (e.g., storage object-level) check can include, for example, capacityTierSizeUsed, performanceTierSizeUsed, and extremePerformanceTierSizeUsed attributes. Performing the second-level check includes predicting (e.g., based on the last seven days of usage data) if each of the storage objects (e.g., storage objects associated with the given pool) is likely to run out of capacity over the same given period of time (e.g., the next 24 hours). Additionally or alternatively, at least one embodiment includes aggregating the predicted/forecasted storage object-level capacity for each of multiple intervals within the given period of time (e.g., for every hour of the next 24 hours). Subsequently, such an embodiment includes determining if the aggregated capacity (e.g., aggregated capacity of the storage object-level) will likely cause the pool (e.g., the pool associated with the storage objects in question) to run out of capacity over the given period of time.

In one or more embodiments, performing the second-level check includes implementing a machine learning algorithm that considers the saturation levels of each of the storage objects associated with a given pool, and that extrapolates data pertaining to one or more capacity metrics for each of the storage objects to that of the pool when the metrics are not equal (e.g., for the storage object(s) as compared to the pool).

Additionally or alternatively, at least one embodiment includes normalizing capacity data of storage objects. In accordance with such an embodiment, in many instances involving storage systems, pool-level capacity data does not match the capacity data of the pool's storage objects when aggregated. In such an embodiment, upon every capacity change event of a pool, a determination is made as to whether the pool will run out of capacity, for example, in the next 24 hours, using pool-level capacity data. If the prediction is positive (i.e., it is determined that the pool will run out of capacity), then such an embodiment includes performing the second-level check in connection with the storage objects associated with that pool.

As part of the second-level check, one or more embodiments include normalizing at least a portion of the capacity data for each of the storage objects (e.g., normalizing the historical capacity data on an hourly basis). Subsequent to the normalization of the data, such an embodiment includes forecasting capacity data for each of the storage objects by utilizing one or more machine learning techniques (e.g., applying an additive regression model to the relevant data), and then aggregating the forecasted capacity data. In one or more embodiments, one or more example additive regression models employed in connection with forecasting capacity data can include one or more additive regression models such as the ones described in, for example, S. J. Taylor et al., "Prophet: forecasting at scale," Facebook Research, Feb. 23, 2017, which is incorporated by reference herein in its entirety.

Also, and by way merely of example and illustration, such an embodiment can include generating forecasted values for each hour of the next 24 hours for each of the storage objects, and then aggregating such values across all of the storage objects. The aggregated data are then used to determine whether the given pool is likely to run out of capacity in the next 24 hours, and if so, such aggregated data are also used to determine a time (e.g., during the next 24 hours) at which the pool's capacity will run out.

Figure 3:
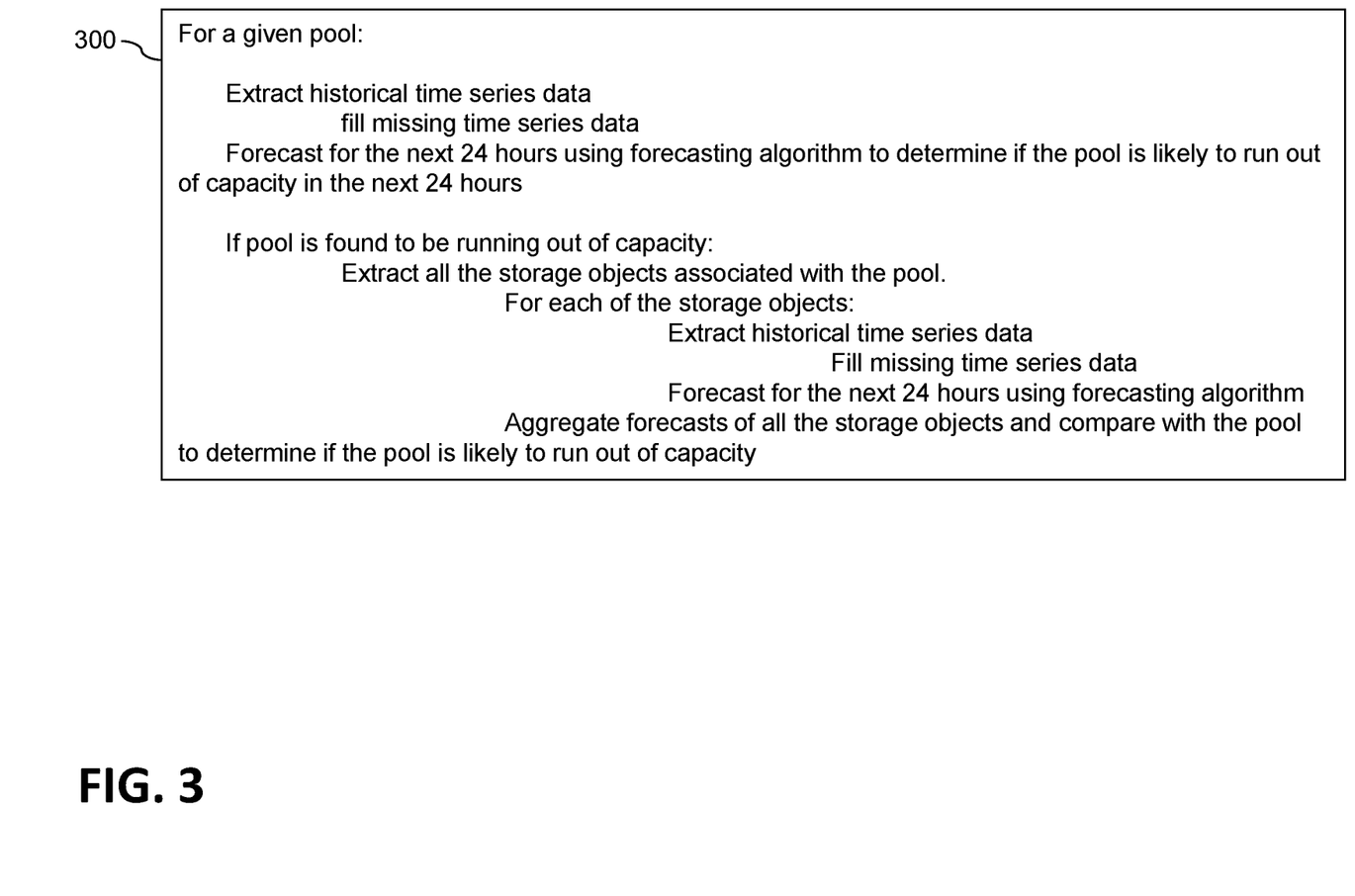
FIG. 3 shows example pseudocode for determining capacity in storage systems in an illustrative embodiment.

FIG. 3 shows example pseudocode for determining capacity in storage systems in an illustrative embodiment. In this embodiment, pseudocode 300 is executed by or under the control of a processing platform, such as a storage management system, or another type of processing platform. For example, the pseudocode 300 may be viewed as comprising a portion of a software implementation of at least part of storage management system 105 of the FIG. 1 embodiment.

The pseudocode 300 includes the following steps. For a given pool of a storage system, the pseudocode 300 includes extracting historical time series data and performing one or more preprocessing steps such as providing missing time series data. Additionally, the pseudocode 300 includes forecasting capacity data for the next 24 hours using a forecasting algorithm to determine whether the pool is likely to run out of capacity in the next 24 hours. If the pool is likely to run out of capacity in the next 24 hours, the pseudocode 300 includes extracting all of the storage objects associated with the pool. For each of the storage objects, the pseudocode 300 further includes extracting historical time series data (and possibly performing one or more preprocessing steps such as providing missing time series data) and forecasting capacity data for the next 24 hours using a forecasting algorithm. Subsequently, the pseudocode 300 includes aggregating the forecasts for all of the storage objects, and comparing the aggregated forecast data with the pool-level data to determine if the pool is likely to run out of capacity.

It is to be appreciated that this particular pseudocode shows just one example implementation of a process for determining capacity in storage systems, and alternative implementations of the process can be used in other embodiments.

Figure 4:
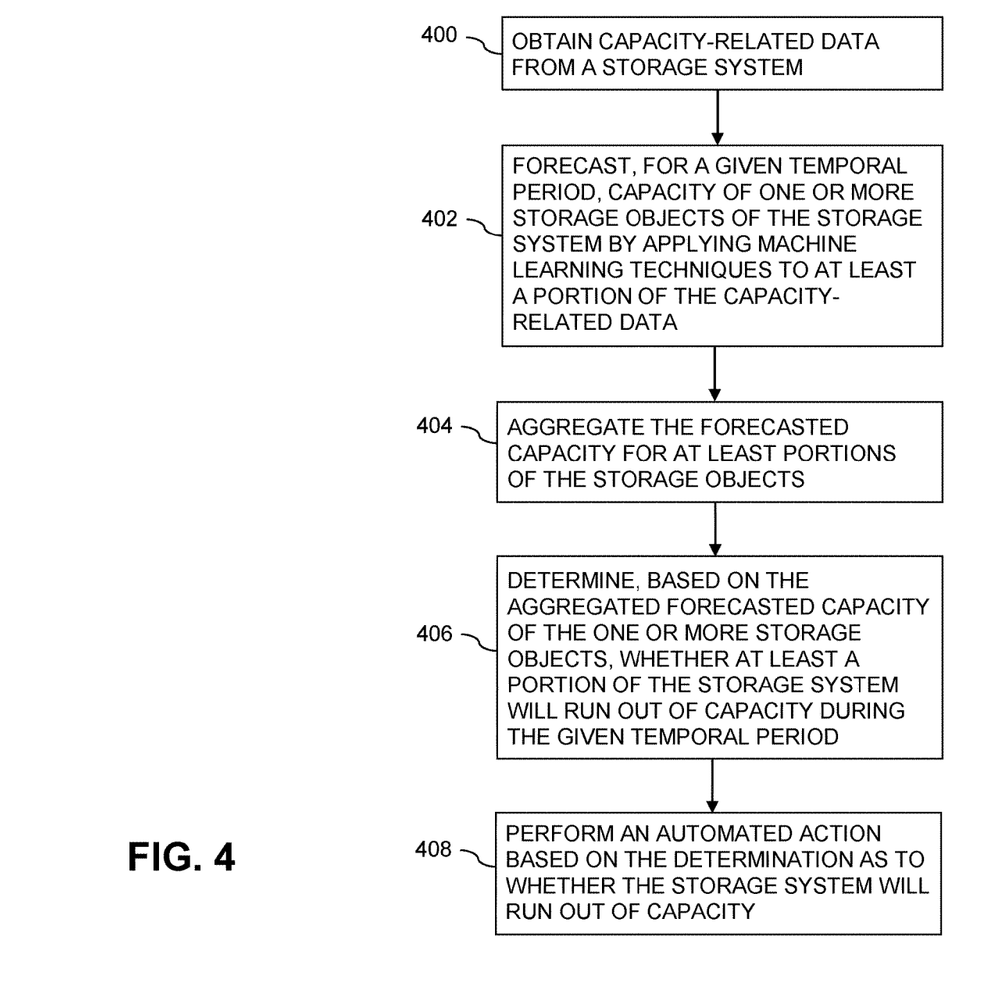
FIG. 4 is a flow diagram of a process for determining capacity in storage systems using machine learning techniques in an illustrative embodiment.

FIG. 4 is a flow diagram of a process for determining capacity in storage systems using machine learning techniques in an illustrative embodiment. It is to be understood that this particular process is only an example, and additional or alternative processes can be carried out in other embodiments.

In this embodiment, the process includes steps 400 through 408. These steps are assumed to be performed by the storage management system 105 utilizing its modules 110, 112 and 114.

Step 400 includes obtaining capacity-related data from at least one storage system. In at least one embodiment, obtaining the capacity-related data includes obtaining capacity-related data from a pool-level of the at least one storage system and/or obtaining capacity-related data from a storage object-level of the at least one storage system. As detailed herein, in such an embodiment, a storage object can include at least one LUN and/or at least one file system. Also, in one or more embodiments, the capacity-related data includes time-series data pertaining to storage allocation and/or user-configurable attributes pertaining to data derived from the at least one storage system. Such user-configurable attributes can include one or more pool-level attributes and/or one or more storage object-level attributes.

Step 402 includes forecasting, for a given temporal period, capacity of each of one or more storage objects of the at least one storage system by applying one or more machine learning techniques to at least a portion of the obtained capacity-related data. In at least one embodiment, applying the one or more machine learning techniques to at least a portion of the obtained capacity-related data includes applying at least one additive regression model to at least a portion of the obtained capacity-related data.

Further, one or more embodiments include fine-tuning the one or more machine learning techniques to obtain and/or process interval data (e.g., hourly interval data) by introducing one or more relevant seasonality patterns. Additionally or alternatively, in at least one embodiment, one or more Fourier transforms are applied to obtained data through the parameters of the one or more machine learning techniques to fine-tune one or more forecasting characteristics. Also, one or more embodiments can include processing steps such as, for example, interpolating missing data via at least one interpolation algorithm, and processing one or more mismatches of data between pools and storage objects via at least one data extrapolation technique.

Referring again to step 402, in at least one embodiment, forecasting capacity includes forecasting capacity at each of multiple intervals within the given temporal period.

Step 404 includes aggregating the forecasted capacity for at least portions of the one or more storage objects. Step 406 includes determining, based at least in part on the aggregated forecasted capacity of the one or more storage objects, whether at least a portion of the at least one storage system will run out of capacity in connection with the given temporal period. In at least one embodiment, determining whether at least a portion of the at least one storage system will run out of capacity includes determining whether one or more pools of the at least one storage system will run out of capacity.

Step 408 includes performing one or more automated actions based at least in part on the determination as to whether the at least a portion of the at least one storage system will run out of capacity. In at least one embodiment, performing the one or more automated actions include automatically performing one or more modifications to storage allocation configurations within the at least one storage system. Additionally or alternatively, in one or more embodiments, performing the one or more automated actions comprises outputting, to one or more users of the at least one storage system, a notification pertaining to at least one of the forecasted capacity of the one or more storage objects and the determination as to whether the at least a portion of the at least one storage system will run out of capacity. In such an embodiment, the notification can include a temporal value corresponding to when the at least one storage system will run out of capacity.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to predict pool-level capacity exhaustion based on storage object-level capacity forecasts determined via utilization of machine learning techniques. These and other embodiments can effectively overcome challenges associated with false positives and false negatives in predicting capacity exhaustion.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
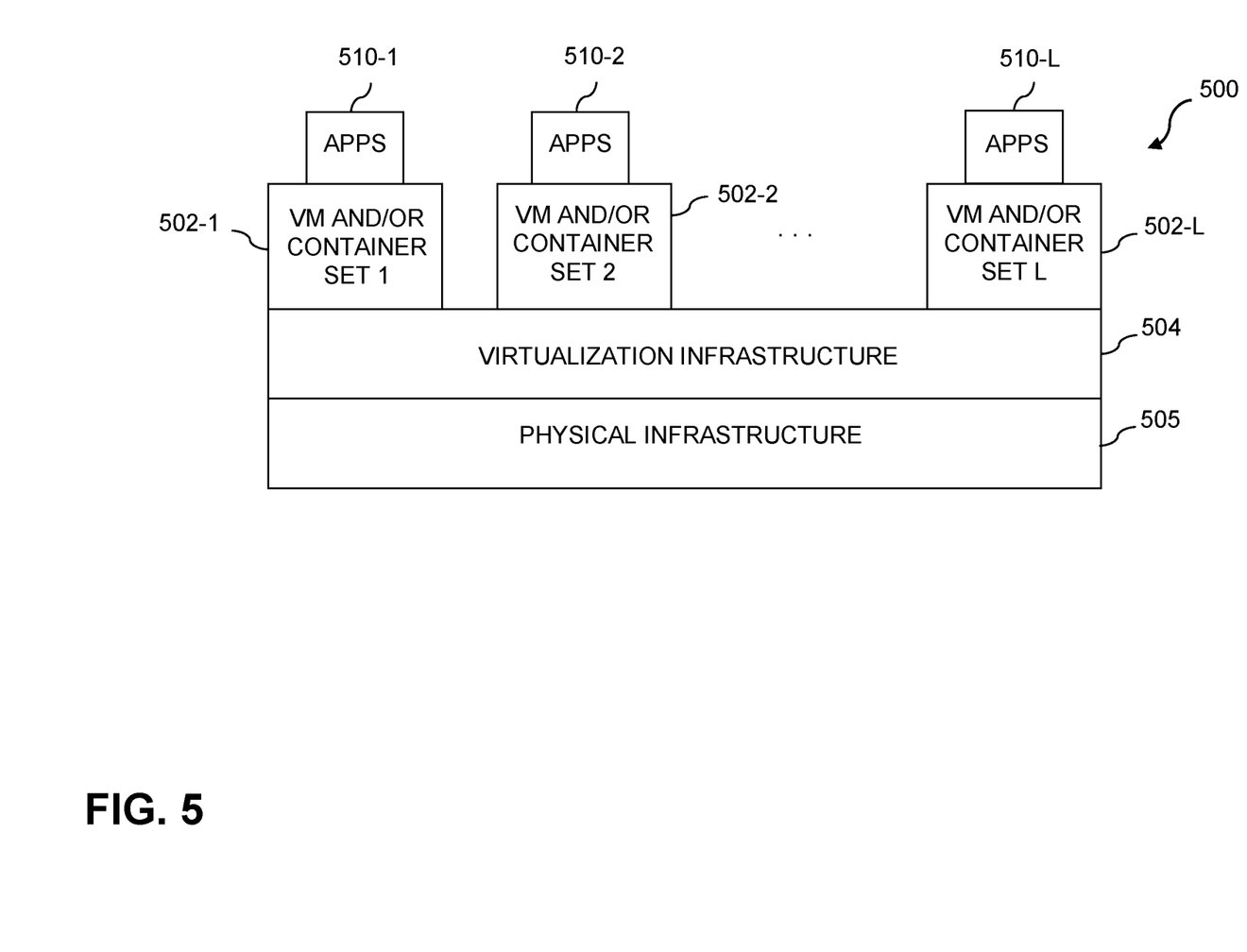
FIGS. 5 and 6 show examples of processing platforms that may be utilized to implement at least a portion of an information processing system in illustrative embodiments.
Figure 6:
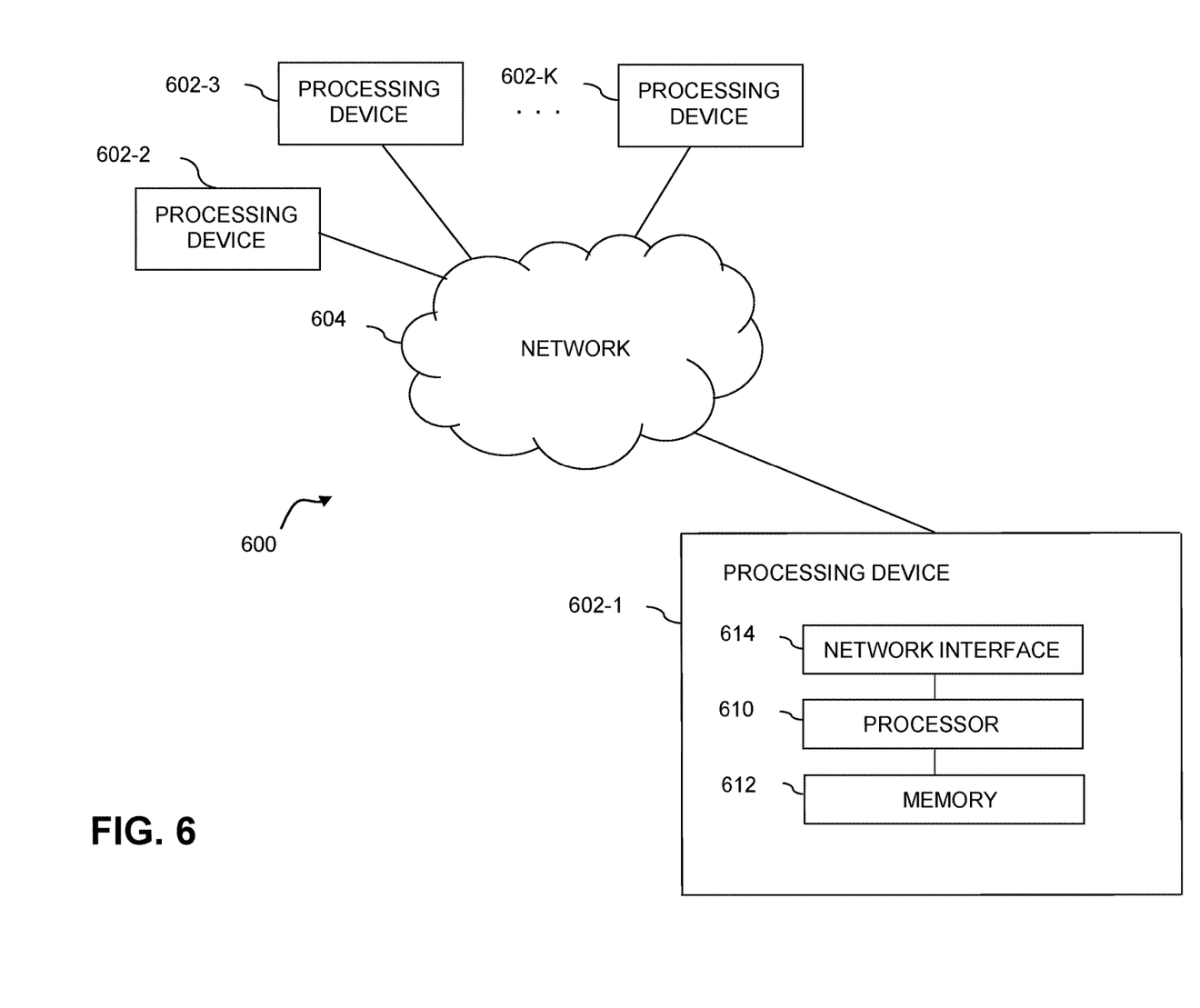

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of information processing systems, modules, and storage systems deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining capacity-related data from at least one storage system;
    forecasting, for a given temporal period, pool-level capacity for at least one storage pool within the at least one storage system by applying one or more machine learning techniques to at least a first portion of the obtained capacity-related data;
    forecasting, for the given temporal period and based at least in part on forecasting the pool-level capacity, capacity of each of one or more storage objects within the at least one storage pool by applying the one or more machine learning techniques to at least a second portion of the obtained capacity-related data;
    aggregating the forecasted capacity for at least portions of the one or more storage objects;
    determining, based at least in part on the aggregated forecasted capacity of the one or more storage objects, whether at least a portion of the at least one storage system will run out of capacity in connection with the given temporal period; and performing one or more automated actions based at least in part on the determination as to whether the at least a portion of the at least one storage system will run out of capacity, wherein performing the one or more automated actions comprises automatically performing one or more modifications to one or more storage allocation configurations within the at least one storage system;

wherein the method is performed by at least one processing device comprising a processor coupled to a memory.

2. The computer-implemented method of claim 1, wherein applying the one or more machine learning techniques to at least a portion of the obtained capacity-related data comprises applying at least one additive regression model to at least a portion of the obtained capacity-related data.

3. The computer-implemented method of claim 1, wherein determining whether at least a portion of the at least one storage system will run out of capacity comprises determining whether the at least one storage pool will run out of capacity.

4. The computer-implemented method of claim 1, wherein forecasting capacity comprises forecasting capacity at each of multiple intervals within the given temporal period.

5. The computer-implemented method of claim 1, wherein obtaining the capacity-related data comprises obtaining capacity-related data from a pool-level of the at least one storage system.

6. The computer-implemented method of claim 1, wherein obtaining the capacity-related data comprises obtaining capacity-related data from a storage object-level of the at least one storage system.

7. The computer-implemented method of claim 1, wherein the capacity-related data comprise time-series data pertaining to storage allocation.

8. The computer-implemented method of claim 1, wherein the capacity-related data comprise user-configurable attributes pertaining to data derived from the at least one storage system.

9. The computer-implemented method of claim 8, wherein the user-configurable attributes comprise one or more pool-level attributes.

10. The computer-implemented method of claim 8, wherein the user-configurable attributes comprise one or more storage object-level attributes.

11. The computer-implemented method of claim 1, wherein each storage object comprises one of a logical unit number and a file system.

12. The computer-implemented method of claim 1, wherein performing the one or more automated actions comprises outputting, to one or more users of the at least one storage system, a notification pertaining to at least one of the forecasted capacity of the one or more storage objects and the determination as to whether the at least a portion of the at least one storage system will run out of capacity.

13. The computer-implemented method of claim 12, wherein the notification comprises a temporal value corresponding to when the at least one storage system will run out of capacity.

14. A non-transitory processor-readable storage medium having stored therein program code of one or more software programs, wherein the program code when executed by at least one processing device causes the at least one processing device:

to obtain capacity-related data from at least one storage system;

to forecast, for a given temporal period, pool-level capacity for at least one storage pool within the at least one storage system by applying one or more machine learning techniques to at least a first portion of the obtained capacity-related data;

to forecast, for the given temporal period and based at least in part on forecasting the pool-level capacity, capacity of each of one or more storage objects within the at least one storage pool by applying the one or more machine learning techniques to at least a second portion of the obtained capacity-related data;

to aggregate the forecasted capacity for at least portions of the one or more storage objects;

to determine, based at least in part on the aggregated forecasted capacity of the one or more storage objects, whether at least a portion of the at least one storage system will run out of capacity in connection with the given temporal period; and to perform one or more automated actions based at least in part on the determination as to whether the at least a portion of the at least one storage system will run out of capacity, wherein performing the one or more automated actions comprises automatically performing one or more modifications to one or more storage allocation configurations within the at least one storage system.

15. The non-transitory processor-readable storage medium of claim 14, wherein determining whether at least a portion of the at least one storage system will run out of capacity comprises determining whether the at least one storage pool will run out of capacity.

16. The non-transitory processor-readable storage medium of claim 14, wherein forecasting capacity comprises forecasting capacity at each of multiple intervals within the given temporal period.

17. An apparatus comprising:

at least one processing device comprising a processor coupled to a memory;

the at least one processing device being configured:

to obtain capacity-related data from at least one storage system;

to forecast, for a given temporal period, pool-level capacity for at least one storage pool within the at least one storage system by applying one or more machine learning techniques to at least a first portion of the obtained capacity-related data;

to forecast, for the given temporal period and based at least in part on forecasting the pool-level capacity, capacity of each of one or more storage objects within the at least one storage pool by applying the one or more machine learning techniques to at least a second portion of the obtained capacity-related data;

to aggregate the forecasted capacity for at least portions of the one or more storage objects;

to determine, based at least in part on the aggregated forecasted capacity of the one or more storage objects, whether at least a portion of the at least one storage system will run out of capacity in connection with the given temporal period; and to perform one or more automated actions based at least in part on the determination as to whether the at least a portion of the at least one storage system will run out of capacity, wherein performing the one or more automated actions comprises automatically performing one or more modifications to one or more storage allocation configurations within the at least one storage system.

18. The apparatus of claim 17, wherein determining whether at least a portion of the at least one storage system will run out of capacity comprises determining whether the at least one storage pool will run out of capacity.

19. The apparatus of claim 17, wherein forecasting capacity comprises forecasting capacity at each of multiple intervals within the given temporal period.

20. The apparatus of claim 17, wherein applying the one or more machine learning techniques to at least a portion of the obtained capacity-related data comprises applying at least one additive regression model to at least a portion of the obtained capacity-related data.

\* \* \* \* \*